United States Patent [19]
Fujita

[11] Patent Number: 4,982,076
[45] Date of Patent: Jan. 1, 1991

[54] MAGNETIC RECORDING MEDIUM

[75] Inventor: Minoru Fujita, Tokyo, Japan

[73] Assignee: Kyodo Printing Co., Ltd., Tokyo, Japan

[21] Appl. No.: 432,756

[22] PCT Filed: Apr. 14, 1988

[86] PCT No.: PCT/JP88/00370
§ 371 Date: Oct. 9, 1989
§ 102(e) Date: Oct. 9, 1989

[87] PCT Pub. No.: WO88/07938
PCT Pub. Date: Oct. 20, 1988

[30] Foreign Application Priority Data
Apr. 17, 1987 [JP] Japan .................. 62-93351

[51] Int. Cl.$^5$ ............................. G06K 19/06
[52] U.S. Cl. ..................... 235/493; 235/449
[58] Field of Search ............ 235/449, 493; 360/2

[56] References Cited
U.S. PATENT DOCUMENTS
4,104,513 8/1978 Pearce .................... 235/493

FOREIGN PATENT DOCUMENTS
2043110 2/1971 France .
1529939 10/1978 United Kingdom .
1534859 12/1978 United Kingdom .

Primary Examiner—Harold I. Pitts
Attorney, Agent, or Firm—Jeffers, Hoffman & Niewyk

[57] ABSTRACT

In a magnetic recording medium, three sorts or more of magnetic patterns being different in the coercive force are combined corresponding to information, and the magnetic pattern with high coercive force is previously magnetized in required direction and the magnetization direction provides a part of the information. In this constitution, the codes for discriminating truth or falsehood of the card cannot be easily deciphered by a magnetic viewer on the market thereby the security can be improved.

1 Claim, 1 Drawing Sheet

DETECTING VOLTAGE OF MAGNETIC HEAD

MAGNETIC RECORDING MEDIUM

BACKGROUND OF THE INVENTION

1. Field of the Invention

The present invention relates to a magnetic recording medium, and more particularly to improvement of security.

The invention can be applied to a magnetic recording medium requiring illegal use preventing function and forgery and altering preventing function, for example, a magnetic card or the like.

2. Description of the Prior Art

In the prior art, such method is adopted that codes for discriminating truth or falsehood are formed on a part of a magnetic card, and read by a magnetic head so as to discriminate truth or falsehood thereby the security of the card is improved.

In the magnetic card of the prior art, such codes for discriminating truth or falsehood are formed by magnetic print patterns and non-magnetic dummy print patterns so that the codes cannot be easily deciphered. Material of high coercive force, such as magnetite ($Fe_3O_4$) or maghemite ($\gamma$-$Fe_2O_3$), is used as material for the magnetic print pattern.

In the magnetic recording medium in the prior art, however, if external magnetic field is applied to read the codes for discriminating truth or falsehood, residual magnetization is produced in the magnetic print patterns thereby the codes for discriminating truth or falsehood can be visualized using a magnetic viewer or the like on the market.

In order to solve the problem, after the external magnetic field is applied for the reading or the like, it must be demagnetized every time resulting in complication of the system.

SUMMARY OF THE INVENTION

In order to solve the above-mentioned problem in the prior art, an object of the invention is to provide a magnetic recording medium which has high security in a simple constitution.

A magnetic recording medium according to the invention is characterized in that three sorts or more of patterns being different in the coercive force are combined corresponding to information.

Since three sorts of the patterns being different in the coercive force are combined, the information for discriminating truth or falsehood is complicated thereby the security can be improved.

Also, when the external field is applied to read the information, the residual magnetization is produced only at a part of the pattern with high coercive force. Thereby, for example, even if the information of the codes for discriminating truth or falsehood is to be deciphered using a magnetic viewer or the like, the pattern with low coercive force cannot be detected. Consequently, without using the demagnetization being a special processing, the security can be improved in quite a simple constituion.

DESCRIPTION OF THE PREFERRED EMBODIMENTS

Embodiments of the invention will now be described in detail referring to the accompanying drawings.

Figure 1:
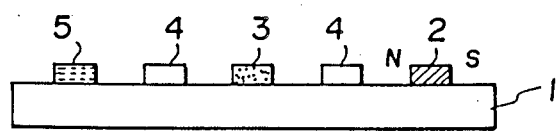
FIG. 1 is a typical sectional view of a magnetic recording medium as an embodiment of the invention.

FIG. 1 is a typical sectional view of a magnetic recording medium as an embodiment of the invention.

In FIG. 1, on a substrate 1 on a card, a print pattern 2 of material with high coercive force, a print pattern 3 of material with low coercive force, a dummy print pattern 4 of non-magnetic material and a print pattern 5 of material with medium coercive force are arranged in combination corresponding to the recording content. In this case, the pattern 2 with high coercive force is previously magnetized in reverse direction to that of the detecting magnetic field.

The material with high coercive force is exemplified by $BaFe_{12}O_{19}$, $SrFe_{12}O_{19}$ or the like. The material with medium coercive force is exemplified by $CrO_2$, $\gamma$-$Fe_2O_3$, Co-$\gamma$-$Fe_2O_3$, $Fe_3O_4$ or the like. The material with low coercive force is exemplified by Fe powder, Sendust alloy powder, Mo-permalloy powder, Mn-Zn ferrite, Ni-Zn ferrite, Cu-Zn ferrite or the like.

Material for the substrate 1 is paper, synthetic resin film or the like. A magnetic recording layer may be formed on a surface of the substrate 1, and each of the print patterns 2, 3, 4 and 5 may be formed on the magnetic recording layer. In addition, the magnetic recording layer may be formed on one surface or both surfaces thereof.

Figure 2:
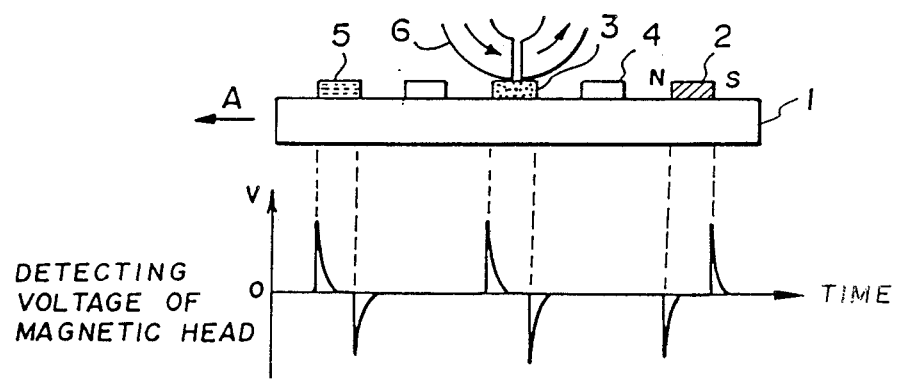
FIG. 2 is a diagram illustrating reading method in the embodiment.

FIG. 2 is a diagram illustrating reading method in the embodiment.

If the card of the embodiment is inserted in a reading device, it is transferred in arrow A direction, and the information is read by a magnetic head 6.

The reading of the information is performed as follows. First, constant magnetic flux is generated in the magnetic head 6 by DC current. The card is transferred in the arrow A direction, and the magnetic patterns of the card are scanned by the magnetic head 6. Leakage magnetic field of the magnetic head 6 in this case is set to amount so that the pattern 2 with high coercive force cannot be magnetized but the pattern 3 with low coercive force and the pattern 5 with medium coercive force can be magnetized.

If the magnetic head 6 passes on the pattern 5 with medium coercive force or the pattern 3 with low coercive force, the magnetic head 5 produces the magnetic coupling with each magnetic pattern, thereby the magnetic flux is varied and the detecting voltage in reverse direction is generated at the starting end and the finishing end of the pattern.

If the magnetic head 6 passes on the pattern 2 with high coercive force, since the pattern 2 is previously magnetized reversely as above described, the detecting voltage in reverse direction to the patterns 5 and 3 is generated in the starting end and the finishing end.

Since the magnetic flux is not varied on the non-magnetic dummy pattern 4, the detecting voltage of the magnetic head 6 is not generated.

Thus as shown in FIG. 2, only when the magnetic patterns 2, 3 and 5 exist, voltage is detected from the magnetic head 6 and the recording content can be read. Moreover, the information with more variety can be supplied according to the polarity of the pattern 2 with high coercive force.

Figure 3:
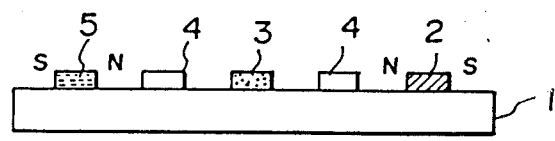
FIG. 3 is a typical sectional view of the embodiment after external magnetic field is applied.

FIG. 3 is a typical sectional view of the embodiment after the external magnetic field is applied.

Since the reading scanning is performed by generating the magnetic flux in the magnetic head 6, the residual magnetization exists on the pattern 2 with high coercive force and the pattern 5 with medium coercive force after the scanning. Consequently, after the information is read by the reading device and the required processing is finished, the card taken from the device is held by the user in the state as shown in FIG. 3.

The information cannot be deciphered from the card in this state using a magnetic viewer on the market. Because the magnetic viewer can detect only the pattern 2 with high coercive force and the pattern 5 with medium coercive force where the residual magnetization exists, but cannot detect the pattern 3 with low coercive force to constitute the information. Also since the polarity of the pattern 2 with high coercive force to constitute the information cannot be discriminated by the magnetic viewer, the security can be further improved.

In this embodiment, although three sorts of the patterns being different in the coercive force and the non-magnetic dummy pattern are used, of course, the invention is not limited to this, but four sorts or more of the magnetic patterns may be used and the polarity of a plurality of patterns with high coercive force may be set, thereby further complicated information can be given with high security.

As above described in detail, since the magnetic recording medium according to the invention is constituted by three sorts or more of the patterns, the information with variety can be given and the forgery becomes difficult. Also since the residual magnetization is produced only at a part of the pattern, for example, even if the information of the codes for discriminating truth or falsehood is to be deciphered using a magnetic viewer or the like, the pattern with low coercive force cannot be detected. As a result, the information cannot be deciphered. Accordingly, without using the demagnetization being a special processing, the security can be improved in quite a simple constitution.

What is claimed is:

1. A magnetic recording medium wherein a series of magnetic patterns are formed on a substrate, said magnetic patterns being located separately, each magnetic pattern is being made of one of three or more of materials of different coercive force, the magnetic patterns of the first material with the highest coercive force being previously magnetized along a direction of arrangement of said magnetic patterns and said thus formed magnetization remaining substantially unchanged when scanned by a magnetic head, the magnetizations of magnetic patterns of the second material with the lowest coercive force being erased when scanned by a magnetic head, the magnetizations of magnetic patterns of the third material with coercive force between that of the first material and that of the second material remaining when scanned by a magnetic head wherein said arrangement of the magnetic patterns and said magnetization directions of said magnetic patterns of the first material correspond to information.

* * * * *